United States Patent
Endo

(10) Patent No.: US 10,099,139 B2
(45) Date of Patent: Oct. 16, 2018

(54) GAME APPARATUS, PROGRAM, AND GAME PROVIDING METHOD

(75) Inventor: Taku Endo, Minato-ku (JP)

(73) Assignee: KONAMI DIGITAL ENTERTAINMENT CO., LTD., Minato-ku, Tokyo (JP)

( * ) Notice: Subject to any disclaimer, the term of this patent is extended or adjusted under 35 U.S.C. 154(b) by 308 days.

(21) Appl. No.: 14/112,436

(22) PCT Filed: Jun. 7, 2012

(86) PCT No.: PCT/JP2012/064671
§ 371 (c)(1),
(2), (4) Date: Oct. 17, 2013

(87) PCT Pub. No.: WO2013/015026
PCT Pub. Date: Jan. 31, 2013

(65) Prior Publication Data
US 2014/0038716 A1 Feb. 6, 2014

(30) Foreign Application Priority Data
Jul. 27, 2011 (JP) .................................. 2011-164506

(51) Int. Cl.
A63F 13/00 (2014.01)
A63F 13/79 (2014.01)
A63F 13/30 (2014.01)

(52) U.S. Cl.
CPC .............. *A63F 13/79* (2014.09); *A63F 13/12* (2013.01); *A63F 2300/5546* (2013.01); *A63F 2300/5566* (2013.01); *A63F 2300/575* (2013.01)

(58) Field of Classification Search
CPC ................. A63F 13/12; A63F 2300/405; A63F 2300/535; A63F 2300/204; A63F 2300/402
See application file for complete search history.

(56) References Cited

U.S. PATENT DOCUMENTS

2004/0259642 A1 12/2004 Tanaka et al.
2005/0282634 A1 12/2005 Yamada et al.
2009/0124393 A1 5/2009 Tanaka et al.

FOREIGN PATENT DOCUMENTS

JP 2000-157742 A 6/2000
JP 2005-028103 A 2/2005
JP 2005-318995 A 11/2005

OTHER PUBLICATIONS

"Sengoku Royale' de Manabu Social Game no Susume", Dengeki Games, vol. 14, Dengeki Nintendo DS, the December issue, extra number, Oct. 15, 2010, pp. 202-203, vol. 10, No. 23.
(Continued)

*Primary Examiner* — Reginald Renwick
(74) *Attorney, Agent, or Firm* — Sughrue Mion, PLLC

(57) ABSTRACT

A controller of a game apparatus causes a display unit of a player to display a first game screen on which commencement of a battle event can be instructed. When the player instructs the commencement of the battle event on the first game screen, if the player has a collection-not-completed item group in which only some items have been collected among a plurality of items, the controller causes the display unit to display, immediately after the first game screen, a second game screen on which another player who owns an item not yet collected by the player in the collection-not-completed item group can be selected as a candidate from whom the item is to be taken when the battle event is achieved.

12 Claims, 5 Drawing Sheets

(56) References Cited

OTHER PUBLICATIONS

"Application Style Vol. 2", a social game information magazine, published by East Press Co. Ltd., Apr. 1, 2011, pp. 26-29.
International Search Report of PCT/JP2012/064671 dated Aug. 14, 2012.

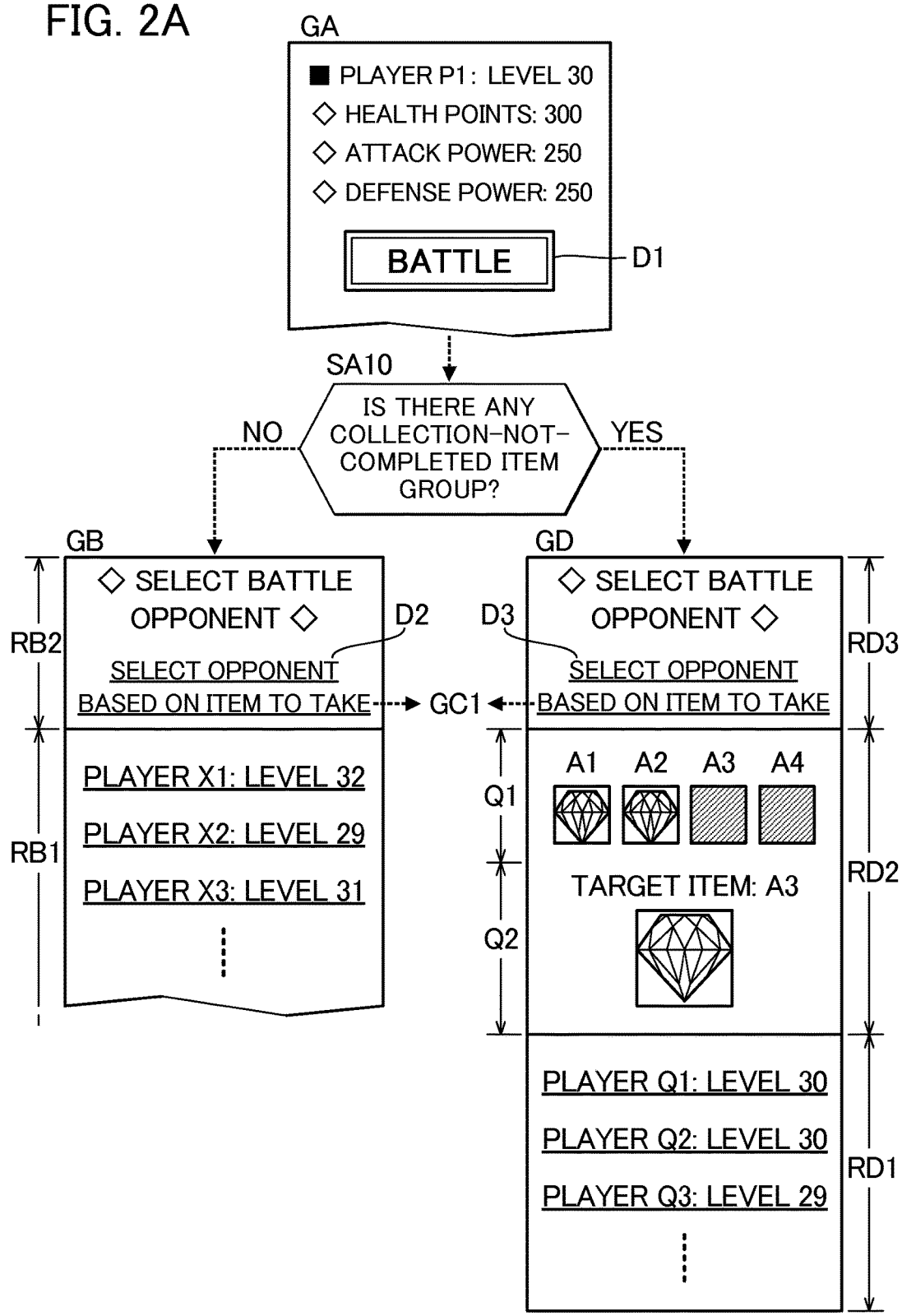

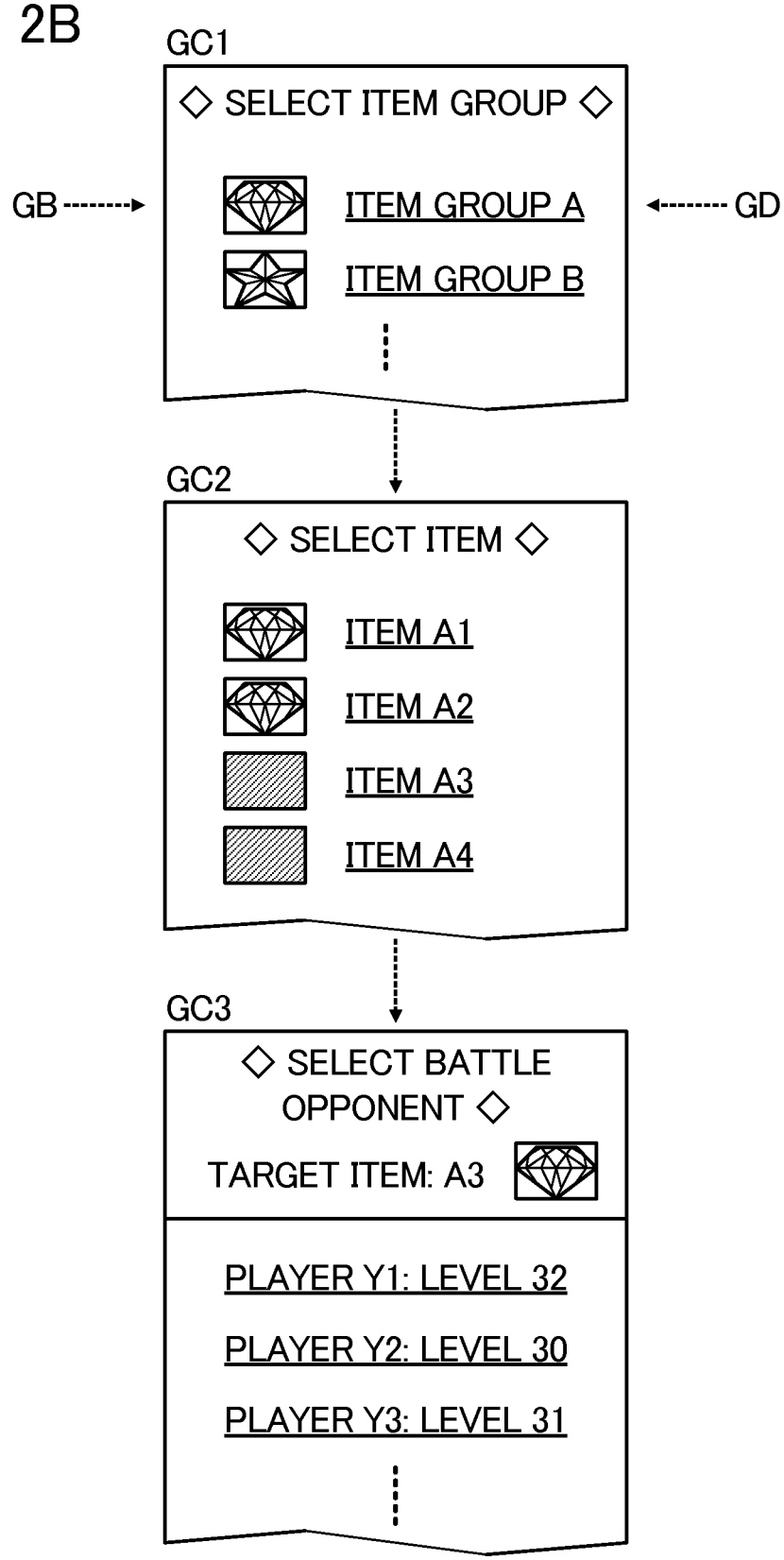

GAME APPARATUS, PROGRAM, AND GAME PROVIDING METHOD

CROSS REFERENCE TO RELATED APPLICATIONS

This is a National Stage of International Application No. PCT/JP2012/064671 filed Jun. 7, 2012, claiming priority based on Japanese Patent Application No. 2011-164506 filed Jul. 27, 2011, the contents of all of which are incorporated herein by reference in their entirety.

TECHNICAL FIELD

The present invention relates to technologies for providing games in which items are collected.

BACKGROUND ART

In conventionally proposed games, items are awarded when various types of events, such as searching and battling, are achieved. For example, Non-Patent Document 1 proposes a game in which various types of privileges are granted to a player when he or she collects (that is, completes) all types of items in one group (hereafter called an item group). In the game disclosed in Non-Patent Document 1, a player who wins in a battle event in which a plurality of players participate acquires an item owned by a defeated player.

CITATION LIST

Non-Patent Document

Non-Patent Document 1: Application Style Vol. 2, a social game information magazine, published by East Press Co. Ltd., Apr. 1, 2011, pp. 26-29 (written in Japanese)

SUMMARY OF INVENTION

Technical Problem

To select a desired item (for example, an item that the player does not own) in one item group as an objective in an event, however, it is necessary to perform troublesome operations, for example, selecting the desired item group from a plurality of types of item groups and then selecting the desired item from a plurality of items in the desired item group. Since a portable device, such as a portable telephone, has limited types and functions of input devices (for example, a pointing device such as a mouse cannot be used), the foregoing problem of troublesome operations required for the user to select a desired item becomes more serious. Taking this situation into consideration, an object of the present invention is to reduce the burden on a player who wants to acquire a desired item in an event.

Solution to Problem

A game apparatus according to the present invention provides each of a plurality of players with a game for collecting a plurality of items belonging to each of a plurality of item groups. The game apparatus includes a display control section that causes a display unit of one player to display a first game screen on which commencement of an event can be instructed; and, when the player instructs the commencement of the event on the first game screen, if the player has a collection-not-completed item group in which all items have not yet been collected, causes the display unit to display, immediately after the first game screen, a second game screen on which another player who owns an item not yet collected by the player in the collection-not-completed item group can be selected as a candidate from whom the item is to be taken when the event is achieved.

A collection-not-completed item group is an item group in which all items belonging to the item group have not yet been collected. More specifically, typical collection-not-completed item groups include an item group in which the player has collected only some items among a plurality of items belonging to that item group, and an item group in which the player has collected no item among a plurality of items belonging to that item group. Typical not-yet-collected items include an item that the player has never acquired (therefore, does not own currently). Not-yet-collected items also include an item acquired by the player in the past but lost thereafter, and as a result, not owned currently (for example, an item taken by another player in a battle event, or an item handed over to another player).

It is preferable that the display control section cause the display unit to display the second screen on which another player who owns an item selected from a plurality of items not yet collected in the collection-not-completed item group can be selected as a candidate from whom the selected item is to be taken, and another item different from the selected item in the collection-not-completed item group can be selected; and, when the other item is selected, cause the display unit to display the second screen on which a player who owns the other item can be selected as a candidate from whom the other item is to be taken.

It is preferable that, when the player instructs the commencement of the event on the first game screen, if the player does not have any collection-not-completed item groups, the display control section cause the display unit to display, immediately after the first game screen, a third game screen on which another player can be selected as a target candidate of the event.

It is preferable that, when the player has a plurality of collection-not-completed item groups, the display control section cause the display unit to display the second game screen for a collection-not-completed item group having the highest number of types of items already collected, among the plurality of collection-not-completed item groups. It is also preferable that, when the player has a plurality of collection-not-completed item groups, the display control section cause the display unit to display the second game screen for a collection-not-completed item group having the smallest number of types of items not yet collected, among the plurality of collection-not-completed item groups.

It is preferable that, when the player has a plurality of collection-not-completed item groups, the display control section cause the display unit to display the second game screen for a collection-not-completed item group in which the player collects a first item earliest in time among the plurality of collection-not-completed item groups.

It is preferable that the plurality of item groups include a first item group for which an item can be acquired within a designated period and a second item group different from the first item group, and, when a plurality of collection-not-completed item groups of the player include both the first item group and the second item group in the designated period, the display control section cause the display unit to display the second game screen for the first item group.

The present invention can also be applied to a program for causing a computer to function as the game apparatus described above. A program of the present invention causes a computer to function as a display control section that causes a display unit of a player to display a game screen, in order to provide each of a plurality of players with a game for collecting a plurality of items belonging to each of a plurality of item groups. The display control section causes a display unit of one player to display a first game screen on which commencement of an event can be instructed; and, when the player instructs the commencement of the event on the first game screen, if the player has a collection-not-completed item group in which all items have not yet been collected, causes the display unit to display, immediately after the first game screen, a second game screen on which another player who owns an item not yet collected by the player in the collection-not-completed item group can be selected as a candidate from whom the item is to be taken when the event is achieved. The program of the present invention is stored in a computer-readable recording medium, is provided for an administrator of the game in that form, and is installed in a computer. Alternatively, the program of the present invention is distributed through a communication network and is installed in a computer.

The present invention can also be applied to a game providing method for providing each of a plurality of players with a game for collecting a plurality of items belonging to each of a plurality of item groups. A game providing method of the present invention includes causing a display unit of one player to display a first game screen on which commencement of an event can be instructed, and, when the player instructs the commencement of the event on the first game screen, if the player has a collection-not-completed item group in which all items have not yet been collected, causing the display unit to display, immediately after the first game screen, a second game screen on which another player who owns an item not yet collected by the player in the collection-not-completed item group can be selected as a candidate from whom the item is to be taken when the event is achieved.

BRIEF DESCRIPTION OF THE DRAWINGS

FIG. 2A is a view explaining transition between game screens.

FIG. 2B is a view explaining transition between game screens.

DESCRIPTION OF EMBODIMENTS

First Embodiment

Figure 1:
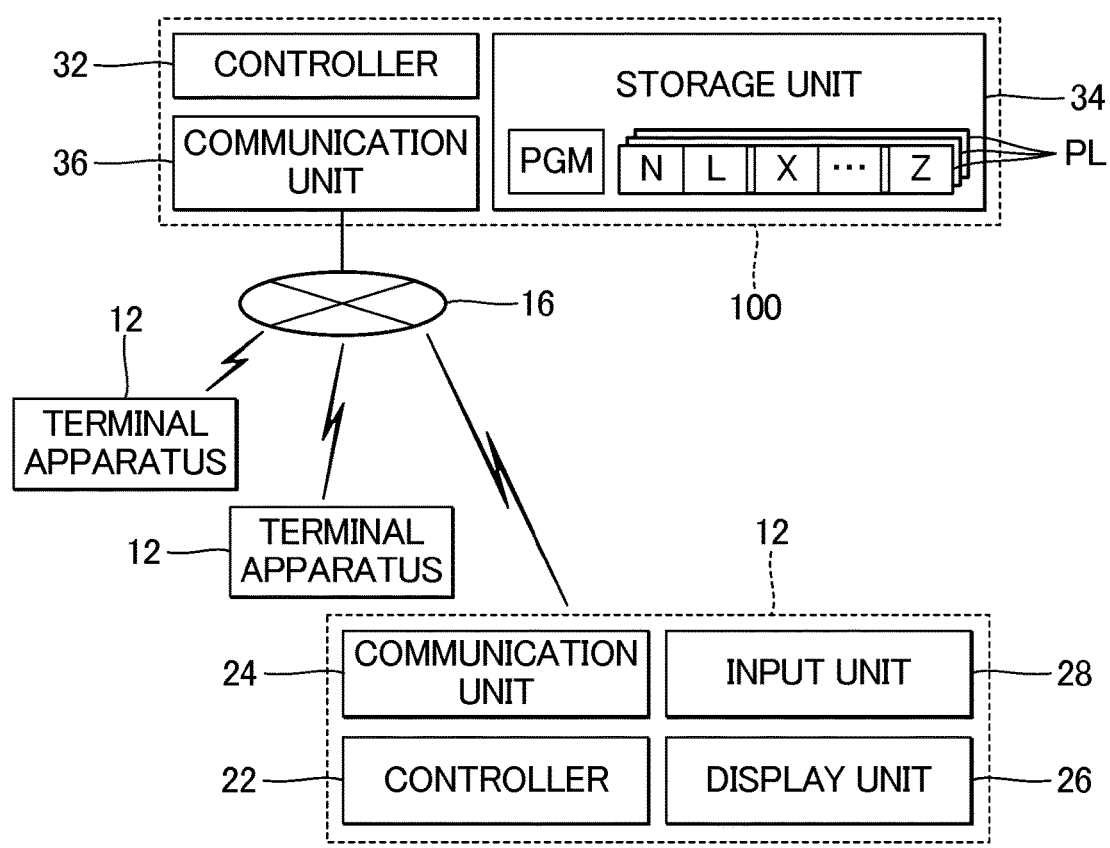
FIG. 1 is a block diagram of a game apparatus according to a first embodiment of the present invention.

FIG. 1 is a block diagram of a game apparatus 100 according to a first embodiment of the present invention. The game apparatus 100 of the first embodiment is a server that communicates with each of a plurality of terminal apparatuses 12 through a communication network (such as the Internet) 16 to provide a game for players who own the terminal apparatuses 12.

Each terminal apparatus 12 is a communication terminal, such as a portable telephone or a personal digital assistant (PDA), and includes a controller 22, a communication unit 24, a display unit 26, and an input unit 28. The controller 22 comprehensively controls the units of the terminal apparatus 12. The communication unit 24 communicates with the game apparatus 100 through the communication network 16. Wireless communication is typically used between the terminal apparatus 12 and the communication network 16, but wired communication is used between the terminal apparatus 12 and the communication network 16 when a desktop personal computer is used as the terminal apparatus 12, for example.

The display unit 26 (such as a liquid crystal display panel) displays various types of images under the control of the controller 22. For example, the display unit 26 displays a screen of the game (hereafter called a game screen) provided by the game apparatus 100. The input unit 28 is used by the player to input an instruction to the terminal apparatus 12, and includes a plurality of manipulanda operated by the player, for example. A touch sensitive panel integrated with the display unit 26, or a microphone used by the player to input sound to give an instruction to the terminal apparatus 12 can be employed as the input unit 28.

The game apparatus 100 is a web server for providing each player with a social game in which a plurality of players interact with each other. The game apparatus 100 provides each terminal apparatus 12 with a browser-based game of a role-playing game (RPG) type in which the player advances when he or she achieves various types of events, such as searching a dungeon and battling against another player.

As shown in FIG. 1, the game apparatus 100 includes a controller 32, a storage unit 34, and a communication unit 36. The controller 32 executes a program PGM to comprehensively control the units of the game apparatus 100. The communication unit 36 communicates with each terminal apparatus 12 through the communication network 16. The storage unit 34 stores the program PGM executed by the controller 32 and various types of data used by the controller 32. As the storage unit 34, a known recording medium, such as a semiconductor recording medium or a magnetic recording medium, or a combination of a plurality of types of recording media can be used. The storage unit 34 may be installed in an external apparatus (such as a server) separated from the game apparatus 100, and the game apparatus 100 may acquire information from the storage unit 34 through the communication network 16. In other words, the storage unit 34 is not essential for the game apparatus 100. The storage unit 34 (one virtual storage unit) may be realized with a plurality of units configured separately from each other.

The storage unit 34 stores, for each player, player information PL based on the game progress. As shown in FIG. 1, each player information PL includes an identification symbol N, a level L, a plurality of parameters X, and possessed-item information Z. The identification system N is a symbol for identifying a player (such as the name or a title of the player). The level L is a value indicating the level of advancement of the player in the game. The plurality of parameters X are variables used in a battle event and other events (such as a variable indicating a battling ability). The parameters X include the health points, the attack power, and the defense power of the player, for example.

The possessed-item information Z indicates items owned by the player (such as treasures and jewels). The storage unit 34 functions as an element (storage section) for storing, for each player, items owned by the player. When each player achieves a searching event, such as searching a dungeon, he or she can acquire an item. In addition, when the player achieves (wins) a battle event against another player, he or she can acquire an item owned by the opponent player in the battle. In the first embodiment, the possessed-item information Z indicates items acquired by the player in the past and currently owned by the player. Therefore, an item acquired by the player but lost thereafter (for example, an item taken by another player or an item transferred to another player) is deleted from the possessed-item information Z.

Items are classified into a plurality of item groups. One item group includes a plurality of types of items. In the first embodiment, the number of types of items is identical among the item groups, for convenience. However, the number of types of items can be different among the item groups. When the player acquires all types of items belonging to one item group (hereafter called completing collection), he or she acquires various types of privileges that can be used to develop the game advantageously. For example, a character that can participate in a battle event or an item that can be used to give the player an advantage in a searching event (such as a recovery item) is awarded to the player as a privilege. It is also possible to give the player a predetermined amount of virtual currency that can be used to purchase items in the game as a privilege.

The controller 32 of the game apparatus 100 executes a process corresponding to a request sent from a terminal apparatus 12 when an operation is made on the input unit 28, and sends image data for a game screen (web page) indicating the result of the process from the communication unit 36 to the terminal apparatus 12 to cause the display unit 26 to display the game screen. The image data sent to the terminal apparatus 12 is hypertext markup language (HTML) data specifying a character string, a hyperlink, or an image for constituting the game screen. As understood from the above description, the controller 32 in the first embodiment functions as an element (display control section) for causing the display unit 26 of the terminal apparatus 12 of each player to display the game screen.

FIG. 2A and FIG. 2B are views explaining game screens that the controller 32 causes the display unit 26 of the terminal apparatus 12 of a certain player P1 to display. When the terminal apparatus 12 starts communicating with the game apparatus 100, the controller 32 causes the display unit 26 of the terminal apparatus 12 to display a game screen GA shown in FIG. 2A. The game screen GA includes, in addition to the identification symbol N (player P1) of the player P1, the level L (level 30), and the value of each parameter X, a part D1 that the player P1 uses to give an instruction to start a battle event (a hyperlink indicated by the character string "BATTLE").

When the player P1 operates the input unit 28 of the terminal apparatus 12 to select the part D1 (that is, the player P1 gives an instruction to start a battle event), the controller 32 of the game apparatus 100 refers to the possessed-item information Z of the player P1 stored in the storage unit 34 to determine whether the player P1 has an item group for which all types of items have not yet been collected (hereafter called a collection-not-completed item group) (step SA10). In other words, the collection-not-completed item group is an item group in which the player P1 owns only some items, or an item group in which the player P1 owns no item (an item group for which collection is underway).

If no collection-not-completed item group exists (No in step SA10), the controller 32 causes the display unit 26 of the terminal apparatus 12 to display a game screen GB shown in FIG. 2A as a screen immediately after the game screen GA, described above. As shown in FIG. 2A, the game screen GB includes a first area RB1 and a second area RB2. The first area RB1 shows players serving as battle opponent candidates in the battle event (hereafter called candidate players) as choices. More specifically, the controller 32 extracts a plurality of candidate players who match a predetermined condition, and lists the identification symbol N and the level L of each candidate player in the first area RB1. Any method can be used to extract candidate players. For example, a predetermined number of players who have the levels L close to the level L of the player P1 can be selected as candidate players. In other words, the candidate players listed in the first area RB1 of the game screen GB are selected without any relationship with the items owned by the player P1.

The player P1 can appropriately operate the input unit 28 to select a desired player (hereafter called a player P2) among the plurality of candidate players listed in the first area RB1, as a battle opponent in the battle event. When the player P1 select the player P2 who serves as the battle opponent, the controller 32 starts the battle event. More specifically, the controller 32 executes a battle process for comparing each parameter X of the player P1 with each parameter X of the player P2 to determine the outcome of the battle, and causes the display unit 26 of the terminal apparatus 12 of the player P1 to display a game screen (not shown) indicating the result of the battle process. As described above, in an executed battle event in which the player P1 does not specify any item, no item is given or taken between the player P1 and the player P2.

The second area RB2 of the game screen GB includes a part for selecting an item to be taken from the battle opponent in the battle event (a hyperlink indicated by the character string "Select opponent based on item to take") D2. When the player P1 operates the input unit 28 to select the part D2, the controller 32 causes the display unit 26 of the terminal apparatus 12 to display game screens GC (GC1 to GC3) shown in FIG. 2B, on which the player P1 selects a desired item to be taken from the battle opponent in the battle event.

The game screen GC1 shows the player P1 a plurality of item groups as choices. When the player P1 operates the input unit 28 to select a desired item group, the controller 32 causes the display unit 26 to display the game screen GC2. The game screen GC2 shows the player P1 a plurality of items (in the example shown in FIG. 2B, four items A1 to A4 in an item group A) constituting the item group selected by the player P1 on the game screen GC1 as choices. Among the plurality of items, items already owned by the player P1 (items A1 and A2 in FIG. 2B) are displayed with their images, and items not owned by the player P1 (items A3 and A4 in FIG. 2B) are displayed without images.

When the player P1 operates the input unit 28 to select a desired item (hereafter called a target item) on the game screen GC2, the controller 32 causes the display unit 26 to display the game screen GC3 shown in FIG. 2B. The game screen GC3 shows the player P1 a plurality of candidate players as choices. More specifically, the controller 32 extracts a predetermined number of candidate players who own one or more pieces of the target item selected by the player P1 on the game screen GC2 and who match a predetermined condition (such as having levels close to the level L of the player P1), and causes the display unit 26 to display the game screen GC3, which lists the identification symbol N and the level L of each candidate player.

The player P1 can appropriately operate the input unit 28 to select a desired player P2 among the plurality of candidate players on the game screen GC3 as the battle opponent in the battle event. When the player P1 selects the player P2 to serve as the battle opponent, the controller 32 executes the battle process to determine the outcome of the battle and causes the display unit 26 of the player P1 to display the result of the battle process. When the player P1 defeats the player P2 in the battle event, the controller 32 moves the target item specified by the player P1 on the game screen GC2 from player P2 to the player P1. More specifically, the target item is deleted from the possessed-item information Z of the player P2 stored in the storage unit 34, and the target item is added to the possessed-item information Z of the player P1 stored in the storage unit 34. When the player P1 loses the battle event to the player P2, no item is taken or given between the player P1 and the player P2.

When it is determined that the player P1 has a collection-not-completed item group after giving the instruction to start the battle event on the game screen GA (Yes in step SA10), the controller 32 causes the display unit 26 of the terminal apparatus 12 of the player P1 to display a game screen GD shown in FIG. 2A, which shows players who own an item not yet collected by the player P1 in the collection-not-completed item group (that is, players from which the player P1 can take an item not yet collected), as candidate players.

Figure 3:
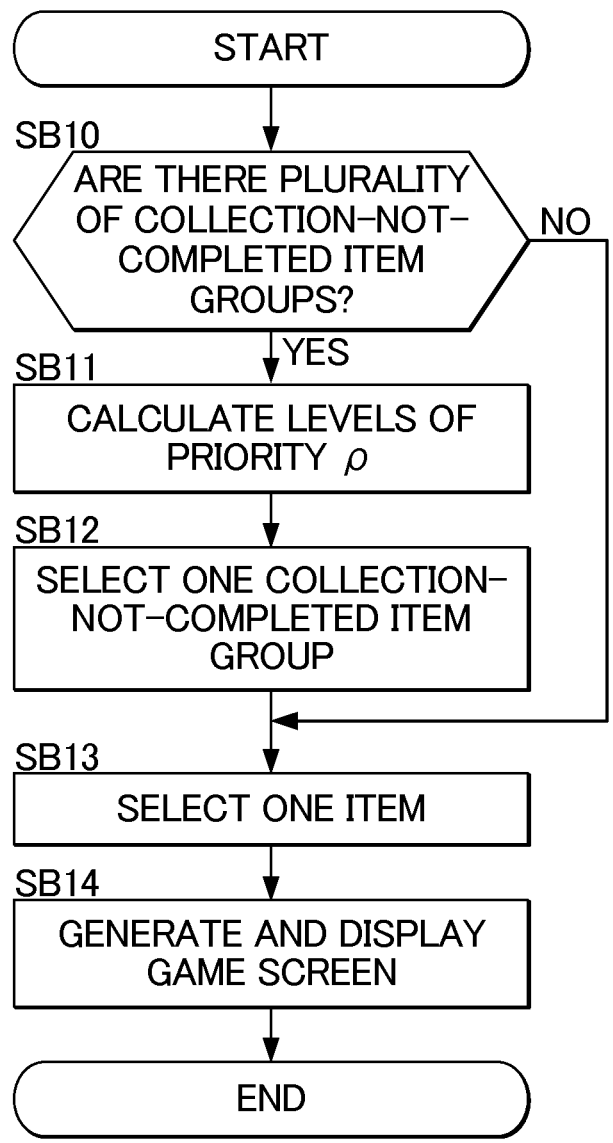
FIG. 3 is a flowchart of a process for generating a game screen.

FIG. 3 is a flowchart of a process for displaying the game screen GD. The controller 32 refers to the possessed-item information Z of the player P1 to determine whether the player P1 has a plurality of collection-not-completed item groups (step SB10). When there exist a plurality of collection-not-completed item groups, the controller 32 calculates the level of priority ρ for each collection-not-completed item group (step SB11). The level of priority ρ in the first embodiment is a value corresponding to the number of types of items owned by the player P1 in each collection-not-completed item group (the degree of closeness to completion of collection). The level of priority ρ is the difference between the number, n1, of types of items belonging to a collection-not-completed item group and the number, n2, of types of items not collected (not owned) by the player P1 in the collection-not-completed item group, as defined by Expression (1) below.

$$\rho = n1 - n2 \quad (1)$$

The controller 32 selects one of the plurality of collection-not-completed item groups of the player P1 according to the levels of priority ρ calculated for the item groups (step SB12). More specifically, the controller 32 selects a collection-not-completed item group having the highest level of priority ρ (a collection-not-completed item group closest to completion of collection) among the plurality of collection-not-completed item groups. In other words, a collection-not-completed item group having the largest number of types of collected items (the smallest number of types of not-collected items) is selected. In the following description, one collection-not-completed item group selected in step SB12 when a plurality of collection-not-completed item groups exist (Yes in step SB10) or a collection-not-completed item group found when that is the only collection-not-completed item group (No in step SB10) is called a target item group.

The controller 32 refers to the possessed-item information Z of the player P1 to select one item not yet owned by the player P1 in the target item group as a target item (step SB13). More specifically, when a plurality of items are not collected in the target item group, one of the plurality of items not yet collected is selected (for example, one item is selected at random) as a target item; and when only one item is not yet collected in the target item group, that item is selected as a target item.

When the target item is selected according to the foregoing procedure, the controller 32 generates the game screen GD shown in FIG. 2A, which shows the player P1 a plurality of candidate players who own the target item, as a screen to be displayed immediately after the game screen GA, described above, and causes the display unit 26 of the terminal apparatus 12 of the player P1 to display the game screen GD (step SB14).

As shown in FIG. 2A, the game screen GD includes a first area RD1, a second area RD2, and a third area RD3. The first area RD1 shows the player P1 a plurality of candidate players who own the target item selected in step SB13 as choices. More specifically, the controller 32 refers to the possessed-item information Z of each player stored in the storage unit 34 to extract a predetermined number of candidate players who own one or more pieces of the target item and who match a predetermined condition (such as having levels close to the level L of the player P1), and lists the identification symbol N and the level L of each candidate player in the first area RD1. In the game screen GB, a plurality of candidate players extracted without any relationship with the item possession state of the player P1 are listed, whereas, in the game screen GD, a plurality of candidate players extracted according to the item possession state of the player P1 (that is, candidate players who own an item not yet collected by the player P1) are listed.

The second area RD2 includes a sub-area Q1 for showing a plurality of items in the target item group selected in step SB12 and a sub-area Q2 for showing the target item selected in step SB13. FIG. 2A shows the game screen GD showing an item A3 as the target item in the sub-area Q2. In the sub-area Q1, among the plurality of items in the target item group, items already owned by the player P1 (items A1 and A2 in FIG. 2A) are displayed with their images, and items not owned by the player P1 (items A3 and A4 in FIG. 2A) are displayed without images.

The player P1 can appropriately operate the input unit 28 to select one desired item among the plurality of items displayed in the sub-area Q1. If the player P1 select an item other than the target item, the controller 32 updates the current target item to the item newly selected by the player P1 from the sub-area Q1. Specifically, the target item displayed in the sub-area Q2 is changed to the newly selected item, and the plurality of candidate players displayed in the first area RD1 are changed to candidate players who own the new target item. It is possible to remove the items already owned by the player P1 among the plurality of items displayed in the sub-area Q1, from the choices.

The player P1 can appropriately operate the input unit 28 to select a desired player P2 among the plurality of candidate players listed in the first area RD1, as a battle opponent in the battle event. When the player P1 selects the player P2, the controller 32 executes the battle process to determine the outcome of the battle between the player P1 and the player P2, and causes the display unit 26 of the player P1 to display the result of the battle process. When the player P1 wins the battle event, the controller 32 transfers the target item displayed in the sub-area Q2 (that is, the target item selected in step SB13 or the target item selected by the player P1 from the sub-area Q1) from player P2 to the player P1. More specifically, the target item is deleted from the possessed-item information Z of the player P2 stored in the storage unit 34, and the target item is added to the possessed-item information Z of the player P1. When the player P1 loses the battle event to the player P2, an item is not taken or given between the player P1 and the player P2.

The third area RD3 of the game screen GD includes a part for selecting an item to be taken from the battle opponent in the battle event (a hyperlink indicated by the character string "Select opponent based on item to take") D3, in the same way as the second area RB2 of the game screen GB. When the player P1 operates the input unit 28 to select the part D3 of the game screen GD, the controller 32 causes the display unit 26 of the terminal apparatus 12 to sequentially display game screens GC (GC1 to GC3), on which the player P1 selects a desired item, in the same way as when the part D2 of the game screen GB is selected. In other words, the player P1 can select an item in any item group as an item to take in the battle event.

In the first embodiment, described above, the game screen GD, which shows candidate players who own an item not yet collected by the player P1, as battle opponent candidates of the player P1 in the battle event, is displayed immediately after the game screen GA. Therefore, the player P1 can select a candidate player from whom a desired item can be taken, without following a procedure for selecting a desired item group from a plurality of types of item groups (for example, the procedure for selecting an item group on the game screen GC1) or a procedure for selecting a desired item in the item group (for example, the procedure for selecting an item on the game screen GC2). In summary, the first embodiment can reduce the burden on the player in selecting a desired item in a battle event.

In the first embodiment, the game screen GD includes the first area RD1, which shows the player P1 a plurality of candidate players who own the target item, and the second area RD2, which shows the player P1 a plurality of items in the target item group. When the player P1 select an item other than the target item among the plurality of items shown in the second area RD2, a plurality of candidate players who own the item selected by the player P1 are listed as choices of the player P1 (candidates from whom the item is to be taken) in the first area RD1. Therefore, an advantage is provided in that, even if the specific target item is not a desired item of the player P1, the player P1 can select another item in the second area RD2 as a new target item to select a candidate player from whom the item is to be taken.

When the player P1 does not have any collection-not-completed item group, the game screen GB, which shows the player P1 candidate players serving as battle opponents in the battle event, is displayed immediately after the game screen GA. The player P1 can select a candidate player without any relationship with the item possession state of the player P1. Therefore, an advantage is provided in that appropriate candidate players can be shown, for example, even to a player who has completed the collection of the items in the item groups and who does not intend to acquire an item from another player.

It is expected that, when a player has a plurality of collection-not-completed item groups, the player tends to give priority to collecting the items in an item group that is close to completion of collection. In the first embodiment, since a collection-not-completed item group having the largest number of types, (n1−n2), of collected items (a collected-not-completed item group closest to completion of collection) among a plurality of collection-not-completed item groups is shown to the player P1 as a selection candidate to the player P1, an advantage is provided in that it is highly likely that the target item is a desired item of the player P1.

It is, however, possible that the target item selected in step SB13 does not match an item actually desired by the player P1. In the first embodiment, the player P1 can select any item in the target item group with an instruction in the sub-area Q1 of the second area RD2 on the game screen GD, as a target item. Candidate players who own the target item newly selected by the player P1 are displayed in the first area RD1. Therefore, an advantage is provided in that the player P1 can select a candidate player from whom a desired item of the player P1 can be taken, with a simple operation.

Second Embodiment

A second embodiment of the present invention will be described below. Note that, for units in the following example embodiments having the same effects or functions as in the first embodiment, the reference symbols used in the above description will be used again, and detailed descriptions thereof will be omitted, if unnecessary.

Figure 4:
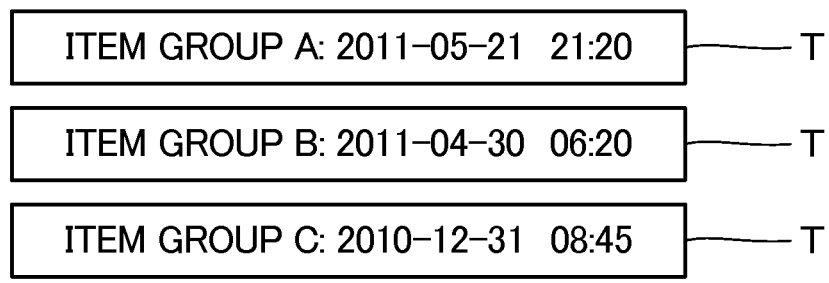
FIG. 4 is a typical view of time data in a second embodiment.

Player information PL stored for each player in a storage unit 34 of a game apparatus 100 according to the second embodiment includes, in addition to the same pieces of information as in the first embodiment (the identification symbol N, the level L, each parameter X, and the possessed-item information Z), time data T for each collection-not-completed item group, shown in FIG. 4. The time data T for one collection-not-completed item group indicates the time when the player acquires a first item among a plurality of items in that collection-not-completed item group (that is, the time when collection of the items in the collection-not-completed item group is started).

Figure 5:
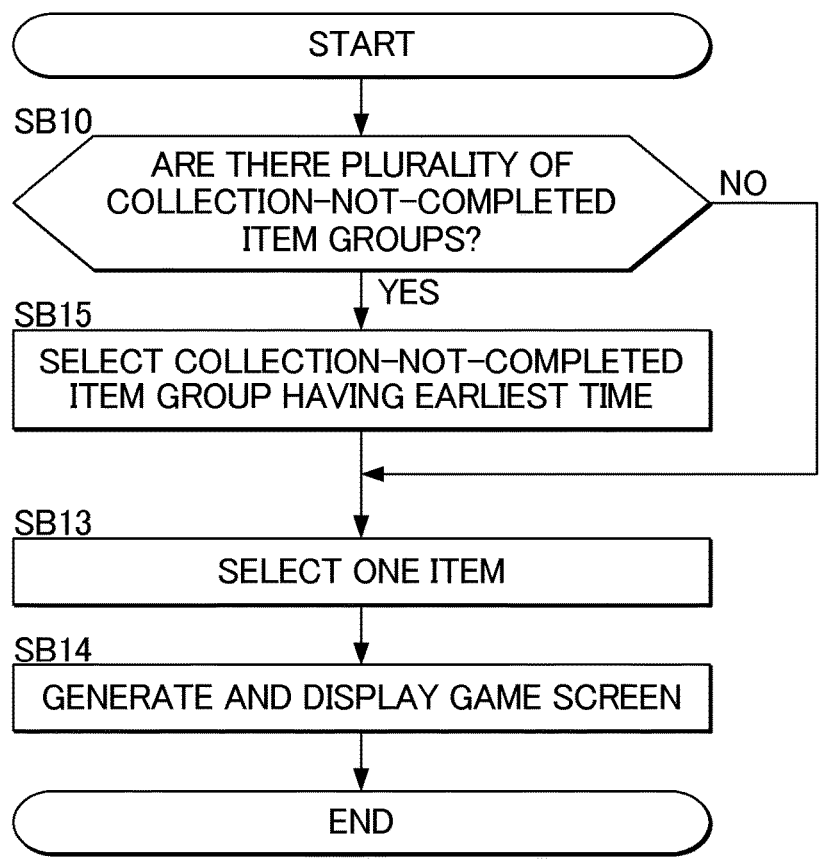
FIG. 5 is a flowchart of a process for generating a game screen in the second embodiment.

FIG. 5 is a flowchart of a process in which a controller 32 of the second embodiment causes the display unit 26 to display the game screen GD. In the process shown in FIG. 5, step SB11 (calculating the level of priority ρ) and step SB12 (selecting a collection-not-completed item group according to the levels of priority ρ) in the first embodiment are replaced with a step SB15. When the player P1 has a plurality of collection-not-completed item groups (Yes in step SB10), the controller 32 selects one collection-not-completed item group having the earliest time (the oldest time) indicated by the time data T among the plurality of collection-not-completed item groups, as a target item group (step SB15). In other words, a collection-not-completed item group for which the player P1 has collected items from the earliest time is selected as a target item group. The processing after step SB15 is the same as in the first embodiment.

The second embodiment has the same advantages as the first embodiment. It is expected that many players tend to want to complete the collection of items in the order in which the players started the collection. In the second embodiment, since a collection-not-completed item group having the earliest time in acquiring a first item is selected from among a plurality of collection-not-completed item groups, as a target item group, and a target item is selected in that item group, an advantage is provided in that it is highly likely that the target item is a desired item of the player P1.

Third Embodiment

In a third embodiment, a plurality of item groups for which a player can collect items are divided into a first item group for which items are awarded in predetermined events (hereafter called limited-period events) that occur in a predetermined period (hereafter called a designated period), and a second item group different from the first item group (that is, an item group for which items are awarded in an unlimited period). In the third embodiment, the first item group is selected with priority as a target item group in the designated period, and a game screen GD is generated.

Figure 6:
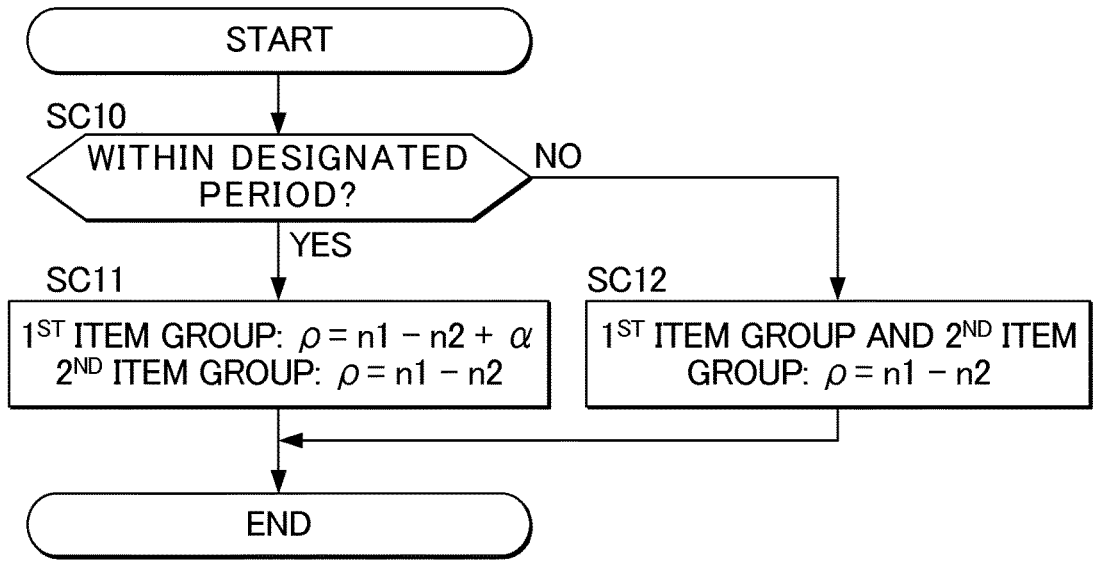
FIG. 6 is a flowchart of a process for calculating the level of priority of each collection-not-completed item group in a third embodiment.

FIG. 6 is a flowchart of a process in which a controller 32 of the third embodiment calculates the level of priority ρ for each collection-not-completed item group (step SB11) when the player P1 has a plurality of collection-not-completed item groups (Yes in step SB10). As shown in FIG. 6, the controller 32 determines whether the current time is within the designated period (step SC10). When the current time is within the designated period (Yes in step SC10), the controller 32 calculates the level of priority ρ for each collection-not-completed item group with different calculation methods between the first item group and the second item group.

Specifically, the controller 32 calculates, for the second item group among the plurality of collection-not-completed item groups, the difference between the number, n1, of types of items in the collection-not-completed item group and the number, n2, of types of items not yet collected by the player P1 in that item group (that is, the number of types of items already collected by the player P1), as the level of priority ρ, in the same way as in the first embodiment. In contrast, for the first item group among the plurality of collection-not-completed item groups, the controller 32 calculates the level of priority ρ by the following expression (2).

$$\rho = n1 - n2 + \alpha \quad (2)$$

The constant α in Expression (2) is set to a value equal to or larger than the maximum of the numbers of types of items in the item groups. Therefore, the level of priority ρ of the first item group always exceeds the level of priority ρ of the second item group in the designated period. The process in step SB12 in which the controller 32 selects a collection-not-completed item group according to the levels of priority ρ is the same as in the first embodiment. Therefore, when the plurality of collection-not-completed item groups of the player P1 include both the first item group and the second item group, even if the second item group is closer to completion of collection than the first item group, the first item group is selected with priority as the target item group.

As understood from Expression (2), when the plurality of collection-not-completed item groups of the player P1 are first item groups, a first item group close to completion of collection among the plurality of first item groups is selected as the target item group. When all of the collection-not-completed item groups of the player P1 are second item groups, one item group close to completion of collection among the plurality of second item groups is selected as the target item group.

In contrast, when the current time is not within the designated period (No in step SC10), the controller 32 calculates the level of priority ρ for each collection-not-completed item group according to Expression (1) without distinguishing between the first item group and the second item group (step SC12). Therefore, outside the designated period, irrespective of whether each collection-not-completed item group is a first item group or a second item group, a collection-not-completed item group close to completion of collection among the plurality of collection-not-completed item groups is selected as the target item group. The process for displaying the game screen GD for the target item group (the processes after step SB11) after step SC11 or step SC12 is the same as in the first embodiment.

The third embodiment also achieves the same advantages as the first embodiment. Since a designated-period event in which an item in a first item group is awarded occurs only in the designated period, it is expected that many players tend to collect items in a first item group with priority in the designated period. In the third embodiment, since a first item group is selected with priority as the target item group in the designated period and a target item is selected, an advantage is provided in that it is highly likely that the target item is a desired item of the player P1.

Modifications

The embodiments described above can be modified in various ways. Specific example modifications will be described below. Two or more of the following modifications selected in a desired manner can be appropriately combined in a range in which no mutual contradiction occurs.

(1) The target item group may be selected from a plurality of collection-not-completed item groups according to a desired condition. For example, the target item group is selected at random from a plurality of collection-not-completed item groups. It is also possible to appropriately combine the condition in the first embodiment, where a collection-not-completed item group close to completion of collection is selected; the condition in the second embodiment, where a collection-not-completed item group having an item collected earliest is selected; and the condition in the third embodiment, where a first item group is selected in a designated period. For example, when the current time is within the designated period and there are a plurality of first item groups having the same level of priority ρ (that is, when the target item group is not specified uniquely only with the conditions in the first and third embodiments), it is possible to select a collection-not-completed item group in which a first item was acquired earliest, as the target item group.

(2) In the first embodiment, a collection-not-completed item group having the highest number, (n1−n2), of types of items already collected is selected among a plurality of collection-not-completed item groups. It is also possible to select a collection-not-completed item group having the lowest number, n2, of types of items not yet collected, among a plurality of collection-not-completed item groups as the target item group. Assuming that each item group includes the same number, n1, of types of items, a collection-not-completed item group having the highest number, (n1−n2), of types of items already collected matches a collection-not-completed item group having the lowest number, n2, of types of items not yet collected. However, if the number, n1, of types of items differs among the item groups, they do not necessarily match. In other words, if the number, n1, of types of items differs among the item groups, a collection-not-completed item group having the highest number, (n1−n2), of types of items already collected is not necessarily a collection-not-completed item group closest to completion of collection. Therefore, from the viewpoint of selecting a collection-not-completed item group closest to completion of collection (having a low number of types of items not yet collected), selecting a collection-not-completed item group having the lowest number, n2, of types of items not yet collected is more suitable than the selection performed in the first embodiment, in which the number, (n1−n2), of types of items already collected is taken into account.

REFERENCE NUMERALS

100: Game apparatus
12: Terminal apparatus
16: Communication network
22: Controller
24: Communication unit
26: Display unit
28: Input unit
32: Controller
34: Storage unit
36: Communication unit
GA, GB, GC (GC1 to GC3), GD: Game screens

The invention claimed is:

1. A game apparatus for dynamically generating a display screen for providing a user with a game for collecting a plurality of items belonging to each of a plurality of item groups, the game apparatus comprising:
a memory configured to store one or more program codes;
a communication unit configured to communicate with a terminal apparatus of a user; and
a processor configured to read the one or more program codes and execute one or more operations comprising:
monitoring a plurality of item groups, each including one or more items to be collected by the user;
determining whether the user has a collection-not-completed item group in which all items in the item group have not yet been collected by the user;
determining one or more other users who own one or more items not yet collected by the user in the collection-not-completed item group as one or more candidate users from whom the one or more items is to be taken when a game event is completed when the user has the collection-not-completed item group in which all items in the item group have not yet been collected by the user;
transmitting, to the terminal apparatus via the communication unit, a first display screen on which the user is capable of instructing commencement of the game event, to cause the terminal apparatus to display the first screen;
receiving an instruction, via the communication unit, for the commencement of the game event from the user; and
in direct response to receiving the instruction for the commencement of the game event, dynamically and automatically generating a second display screen, and transmitting the second display screen to the terminal apparatus via the communication unit, to cause the terminal apparatus to display the second display, the second display screen configured to display:
a first menu listing a selectable part for selecting an item to be taken from an opponent in the game event in a first area of the second display screen,
a second menu listing the one or more items not yet collected by the user in the collection-not-completed item group in a second area of the second display screen, and
a third menu listing the one or more candidate users in a third area of the second display screen,
wherein the third menu displays a limited list of the one or more candidate users corresponding to a selected item among the one or more items displayed in the second menu, each of the one or more candidate users being selectable to execute the game event corresponding to the respective one or more candidate users, and
wherein the second menu listing and the third menu listing are displayed while the selectable part of the first menu listing is in an unselected state.

2. The game apparatus according to claim 1, wherein the processor displays the second display screen on which another user who owns the item selected from the plurality of items not yet collected in the collection-not-completed item group is selectable as the candidate from whom the selected item is to be taken, and another item different from the selected item in the collection-not-completed item group can be selected; and, when the other item is selected, displays the second screen on which a user who owns the other item can be selected as a candidate from whom the other item is to be taken.

3. The game apparatus according to claim 1, wherein, when the user instructs the commencement of the game event on the first display screen, if the user does not have any collection-not-completed item groups, the processor displays, immediately after the first display screen, a third display screen on which another user is selectable as a target candidate of the event.

4. The game apparatus according to claim 1, wherein, when the user has a plurality of collection-not-completed item groups, the processor displays the second display screen for the collection-not-completed item group having the highest number of types of items already collected, among the plurality of collection-not-completed item groups.

5. The game apparatus according to claim 1, wherein, when the user has a plurality of collection-not-completed item groups, the processor displays the second display screen for a collection-not-completed item group having the smallest number of types of items not yet collected, among the plurality of collection-not-completed item groups.

6. The game apparatus according to claim 1, wherein, when the user has a plurality of collection-not-completed item groups, the processor displays the second display screen for a collection-not-completed item group in which the user collects a first item earliest in time among the plurality of collection-not-completed item groups.

7. The game apparatus according to claim 1, wherein the plurality of item groups include a first item group for which an item can be acquired within a designated period and a second item group different from the first item group; and
when a plurality of collection-not-completed item groups of the user include both the first item group and the second item group in the designated period, the processor displays the second display screen for the first item group.

8. The game apparatus according to claim 1, wherein
there is a plurality of other users who own the item not yet collected by the user in the collection-not-completed item group; and
a user, from among the plurality of other users, who has a level of advancement in a game that is close to a level of the user is selected as the candidate user.

9. A non-transitory computer readable medium having stored thereon a program for causing a computer to function a method to display a display screen, in order to provide a user with a game for collecting a plurality of items belonging to each of a plurality of item groups, the method comprising:
monitoring a plurality of item groups, each including one or more items to be collected by a user;

determining whether the user has a collection-not-completed item group in which all items in the item group have not yet been collected by the user;

determining one or more other users who own one or more items not yet collected by the user in the collection-not-completed item group as one or more candidate users from whom the one or more items is to be taken when a game event is complete when the user has the collection-not-completed item group in which all items in the item group have not yet been collected by the user;

transmitting, to a terminal apparatus via a communication unit, a first display screen on which the user is capable of instructing commencement of the game event, to cause the terminal apparatus to display the first screen;

receiving an instruction, via the communication unit, for the commencement of the game event from the user; and in direct response to receiving the instruction for the commencement of the game event, dynamically and automatically generating a second display screen, and transmitting the second display screen to the terminal apparatus via the communication unit, to cause the terminal apparatus to display the second display, the second display screen configured to display:

a first menu listing a selectable part for selecting an item to be taken from an opponent in the game event in a first area of the second display screen, a second menu listing the one or more items not yet collected by the user in the collection-not-completed item group in a second area of the second display screen, and a third menu listing the one or more candidate users in a third area of the second display screen, wherein the third menu displays a limited list of the one or more candidate users corresponding to a selected item among the one or more items displayed in the second menu, each of the one or more candidate users being selectable to execute the game event corresponding to the respective one or more candidate users, and wherein the second menu listing and the third menu listing are displayed while the selectable part of the first menu listing is in an unselected state.

10. The non-transitory computer readable medium according to claim 9, wherein there is a plurality of other users who own the item not yet collected by the user in the collection-not-completed item group; and a user, from among the plurality of other users, who has a level of advancement in a game that is close to a level of the user is selected as the candidate user.

11. A computer implemented game providing method for providing a user with a game for collecting a plurality of items belonging to each of a plurality of item groups, the game providing method comprising:

monitoring a plurality of item groups, each including one or more items to be collected by a user;

determining whether the user has a collection-not-completed item group in which all items in the item group have not yet been collected by the user;

determining one or more other users who own one or more items not yet collected by the user in the collection-not-completed item group as one or more candidate users from whom the one or more items is to be taken when a game event is completed when the user has the collection-not-completed item group in which all items in the item group have not yet been collected by the user;

transmitting, to a terminal apparatus via a communication unit, a first display screen on which the user is capable of instructing commencement of the game event, to cause the terminal apparatus to display the first screen;

receiving an instruction, via the communication unit, for the commencement of the game event from the user; and in direct response to receiving the instruction for the commencement of the game event, dynamically and automatically generating a second display screen, and transmitting the second display screen to the terminal apparatus via the communication unit, to cause the terminal apparatus to display the second display, the second display screen configured to display:

a first menu listing a selectable part for selecting an item to be taken from an opponent in the game event in a first area of the second display screen, a second menu listing the one or more items not yet collected by the user in the collection-not-completed item group in a second area of the second display screen, and a third menu listing the one or more candidate users in a third area of the second display screen, wherein the third menu displays a limited list of the one or more candidate users corresponding to a selected item among the one or more items displayed in the second menu, each of the one or more candidate users being selectable to execute the game event corresponding to the respective one or more candidate users, and wherein the second menu listing and the third menu listing are displayed while the selectable part of the first menu listing is in an unselected state.

12. The game providing method according to claim 11, wherein there is a plurality of other users who own the item not yet collected by the user in the collection-not-completed item group; and a user, from among the plurality of other users, who has a level of advancement in a game that is close to a level of the user is selected as the candidate user.

* * * * *